(12) United States Patent
Moon

(10) Patent No.: US 8,269,909 B2
(45) Date of Patent: Sep. 18, 2012

(54) METHOD FOR FABRICATION OF LIQUID CRYSTAL DISPLAY

(75) Inventor: Nam Chil Moon, Bucheon-si (KR)

(73) Assignee: Dongbu HiTek Co., Ltd., Seoul (KR)

( * ) Notice: Subject to any disclaimer, the term of this patent is extended or adjusted under 35 U.S.C. 154(b) by 421 days.

(21) Appl. No.: 12/643,781

(22) Filed: Dec. 21, 2009

(65) Prior Publication Data

US 2010/0165279 A1 Jul. 1, 2010

(30) Foreign Application Priority Data

Dec. 31, 2008 (KR) .................. 10-2008-0138214

(51) Int. Cl.
*G02F 1/136* (2006.01)

(52) U.S. Cl. ............ 349/46; 349/43; 349/139; 349/138; 349/140; 257/59; 257/720; 345/92

(58) Field of Classification Search .................... 257/59, 257/720; 349/46, 139, 138, 140; 345/92
See application file for complete search history.

(56) References Cited

U.S. PATENT DOCUMENTS

| 6,037,234 | A  | * | 3/2000 | Hong et al. ................... 438/396 |
| 6,271,897 | B1 | * | 8/2001 | Ichikawa et al. ............... 349/43 |
| 2009/0140321 | A1 | * | 6/2009 | Lai et al. ....................... 257/324 |

* cited by examiner

*Primary Examiner* — Edward Glick
*Assistant Examiner* — Sang Nguyen
(74) *Attorney, Agent, or Firm* — The Law Offices of Andrew D. Fortney; Andrew D. Fortney

(57) ABSTRACT

Disclosed is a method for fabrication of a liquid crystal display with improved optical transmission, which includes sequentially forming a first oxide film, a silicon film, and a second oxide film on a semiconductor substrate, selectively etching the silicon film and the second oxide film to expose the first oxide film, forming a oxynitride film on at least the silicon film, forming a polysilicon layer over the oxynitride film, selectively etching the polysilicon layer to form a top electrode, forming an insulating film on and/or over the substrate, including the top electrode, and forming metal wirings on outer regions of the top electrode.

20 Claims, 4 Drawing Sheets

METHOD FOR FABRICATION OF LIQUID CRYSTAL DISPLAY

CROSS REFERENCE TO RELATED APPLICATION

This application claims the benefit of Korean Patent Application No. 10-2008-0138214, filed on Dec. 31, 2008, which is hereby incorporated by reference as if fully set forth herein.

BACKGROUND OF THE DISCLOSURE

1. Field of the Disclosure

The present invention relates to liquid crystal displays and, more particularly, to a method for fabrication of a liquid crystal display with improved optical transmission.

2. Discussion of the Related Art

In general, a liquid crystal display uses a primary principle in that a liquid crystal array is regulated by injecting liquid crystal material between two substrates and applying a voltage to two electrodes located inside the substrates, so as to transmit light through a polarizer attached to the substrate, or block the light.

Based on the foregoing principle, in order to improve performance of a display and/or to widen the range of applications thereof, introduction of some components, such as a phase difference plate, a reflection plate, a backlight, a color filter, etc., and variations and improvements in various applications including, for example, a polarizer, an alignment layer and a rubbing technique used for the same, configuration of an electrode, a glass substrate, etc. are currently being attempted.

FIG. 1 is a schematic view illustrating a general liquid crystal display.

Referring to FIG. 1, a typical liquid crystal display includes a bottom substrate 10, a top substrate 40, and a liquid crystal 20 injected therebetween, wherein the top substrate 40 has a thin film structure including an oxide film 40a and/or polysilicon layer 40b. The top polysilicon layer 40b is used as a top electrode.

However, the foregoing structure using polysilicon as the top electrode may restrict enhancements in optical transmission of the liquid crystal display.

Therefore, a variety of studies and investigations into development of a liquid crystal display with improved optical transmission are currently being conducted.

SUMMARY OF THE INVENTION

Accordingly, the present invention is directed to solving the foregoing problem(s) in regard to conventional techniques, and an object of embodiments of the present invention is to provide a method for fabrication of a liquid crystal display with improved optical transmission.

Additional advantages, objects, and features of the invention will be set forth in part in the description which follows and in part will become apparent to those skilled in the art upon examination of the following or may be learned from practice of the invention. The objectives and other advantages of the invention may be realized and attained by the structures particularly pointed out in the written description and claims hereof as well as the appended drawings.

Accordingly, to achieve the above object(s), there is provided a method for fabrication of a liquid crystal display, comprising: forming a first oxide film, a silicon film, and a second oxide film in sequential order on a semiconductor substrate; selectively etching the silicon film and the second oxide film to expose the first oxide film; forming an oxynitride film on the first oxide film and the silicon film; forming a polysilicon layer over the entire oxynitride film; selectively etching the polysilicon layer, forming a top electrode; forming an insulating film on or over the substrate, including the top electrode; and forming metal wirings on outer regions of the top electrode.

As described above, according to embodiments of the present invention, a polysilicon top electrode may have a relatively small thickness, compared to conventional polysilicon layers, thereby improving optical transmission of the display. Moreover, various embodiments of the present invention use a $N_2$ treatment to form an opening on the polysilicon layer which in turn enhances optical transmission of the device.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle(s) of the disclosure. In the drawings.

DETAILED DESCRIPTION

Reference will now be made in detail to embodiments of the present invention, examples of which are illustrated in the accompanying drawings. Wherever possible, the same reference numbers will be used throughout the drawings to refer to the same or like parts.

Most of the terms mentioned herein have general meanings commonly understood in the applicable arts; however, some terms may be defined by the present disclosure, and meanings thereof are clearly stipulated in the detailed description of the present invention. Accordingly, these terms should be understood according to the meanings thereof specified in the present disclosure, rather than according to their simple and general names.

With reference to the accompanying drawings, a process for fabricating a liquid crystal display according to various embodiments of the present invention is described in further detail.

FIGS. 2 to 6 are views illustrating a process for fabricating a liquid crystal display according to various embodiments of the present invention.

In FIGS. 2 to 6, among a whole liquid crystal display, only a partial region that is the subject of various embodiments of the present invention is illustrated. Illustration of other regions of the display having the same configuration as that of a conventional liquid crystal display will be omitted to avoid repetition where it may make the subject matter of the invention unclear.

Figure 1:
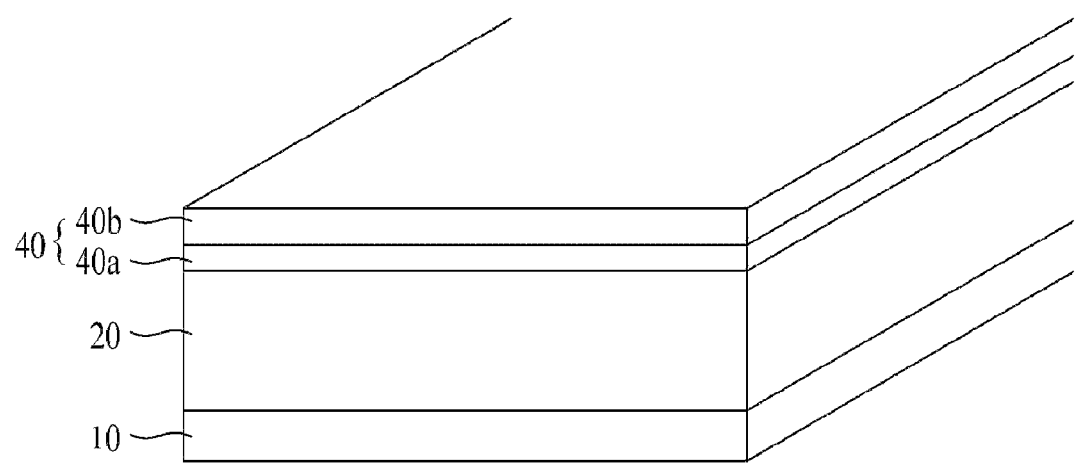
FIG. 1 is a schematic view illustrating a general liquid crystal display.
Figure 2:
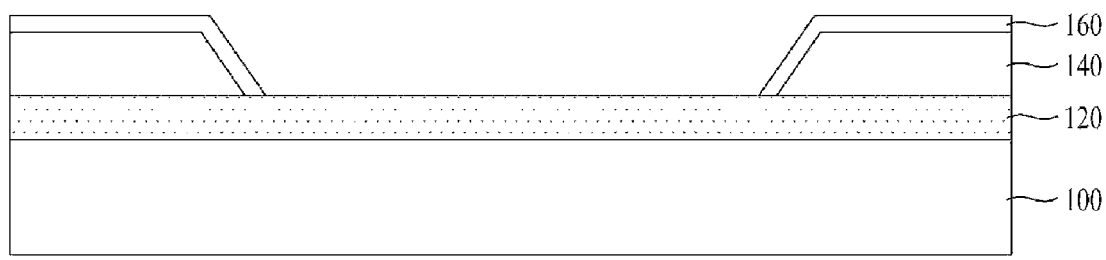
FIGS. 2 to 6 are views illustrating a process for fabricating a liquid crystal display according to various embodiments of the present invention.

Referring to FIG. 2, a first oxide film 120, a silicon film 140 and a second oxide film 160 are sequentially formed on a silicon substrate 100. Generally, the first oxide film 120 and the second oxide film 160 comprise a silicon dioxide layer, which may be deposited by chemical vapor deposition (CVD) from silane and oxygen (e.g., an undoped silicate glass, or USG) or tetraethyl orthosilicate (TEOS) and oxygen and/or ozone. The silicon film 140 may be formed by CVD from a silicon source such as silane gas. Then, the substrate is subjected to photolithography, involving exposure and development to form a photoresist pattern (not shown) exposing a region of the second oxide film and/or the silicon film, at which an electrode may be formed. The exposed second oxide film 160 and the exposed silicon film 140 are selectively etched using the photoresist pattern as a mask. In this case, the second film 160 and the silicon film 140 are preferably etched until a surface of the first oxide film 120 is exposed. Alternatively, the silicon film 140 may be etched (e.g., by plasma etching using a hydrofluorocarbon etchant) prior to deposition of the thin oxide film 160. Since the oxide film 160 may be the same as the oxide film 120, it may not be necessary to etch the oxide film 160 if it is deposited after etching the silicon film 140.

Figure 3:
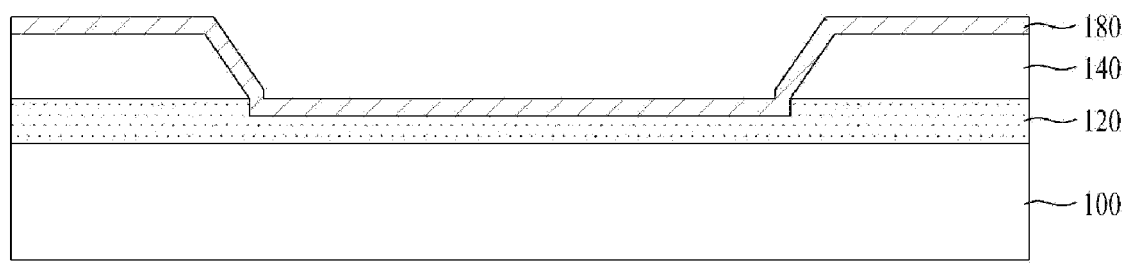

Next, as illustrated in FIG. 3, the exposed first oxide film 120 and second oxide film 160 are subjected to $N_2$ plasma treatment to form an oxynitride film 180. Here, the oxynitride film 180 is formed to a predetermined depth from a surface of the exposed first oxide film 120 and also on or over the sidewalls and an uppermost surface of the silicon film 140. In other words, the oxynitride film, which may comprise a silicon oxynitride, is formed over the entire resultant product.

Figure 4A:
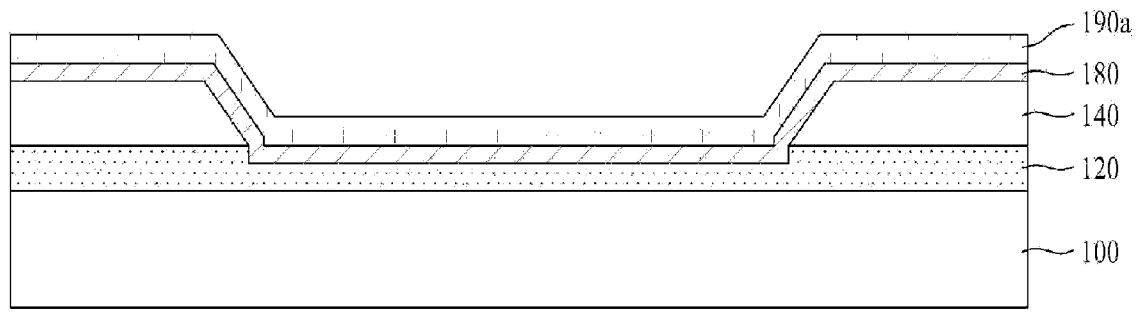

Referring to FIG. 4A, a polysilicon layer 190a useable as a top electrode (e.g., a top electrode-formable polysilicon layer) is formed on and/or over the entire oxynitride film 180. A thickness of the polysilicon layer 190a may range from 100 to 150 Å.

Figure 4B:
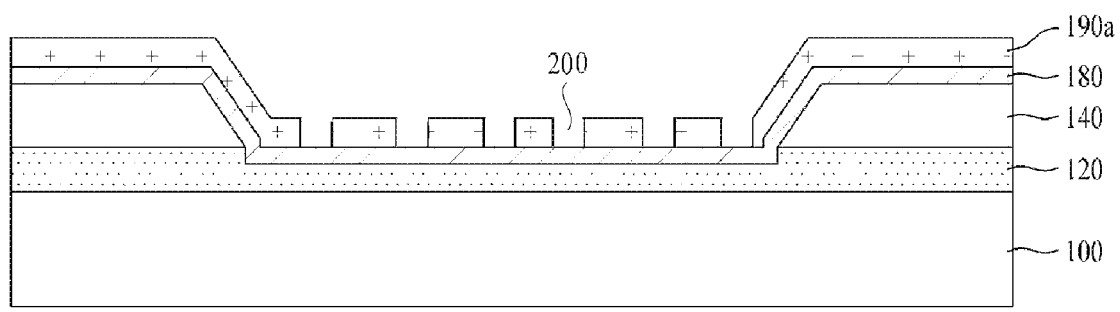

Alternatively, as illustrated in FIG. 4B, the polysilicon layer 190a may be selectively etched to form a plurality of openings 200 (which may have a circular or rectangular shape, either of which may also take the form of concentric rings, but which are generally electrically connected to each other) spaced from one another (e.g., at equal and/or constant intervals). In this regard, each opening 200 may be formed by etching the polysilicon layer until the oxynitride film 180 is exposed. Circular or rectangular openings are illustrated herein; however, the opening 200 may have another shape without particular restriction thereto.

Figure 5:
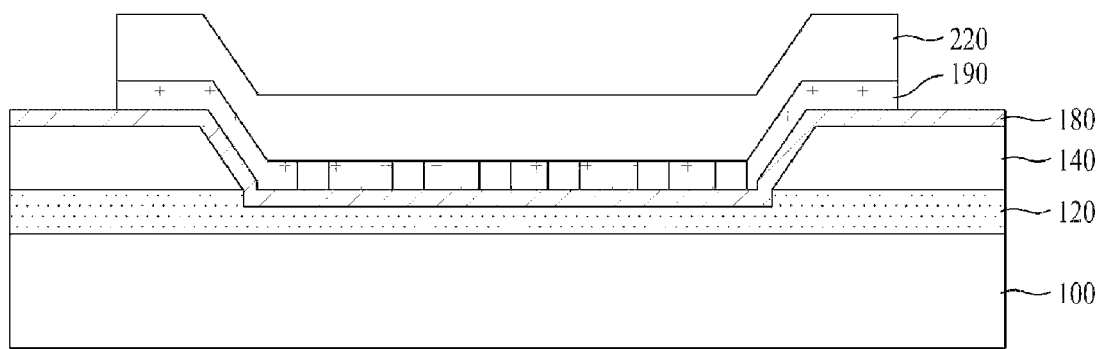

Next, as illustrated in FIG. 5, a photoresist (not shown) is applied to the polysilicon layer 190a, followed by exposure and development thereof to conduct patterning, resulting in a photoresist pattern 220. The exposed polysilicon layer 190a is selectively etched using the photoresist pattern 220 as a mask, thus forming a top electrode 190.

Figure 6:
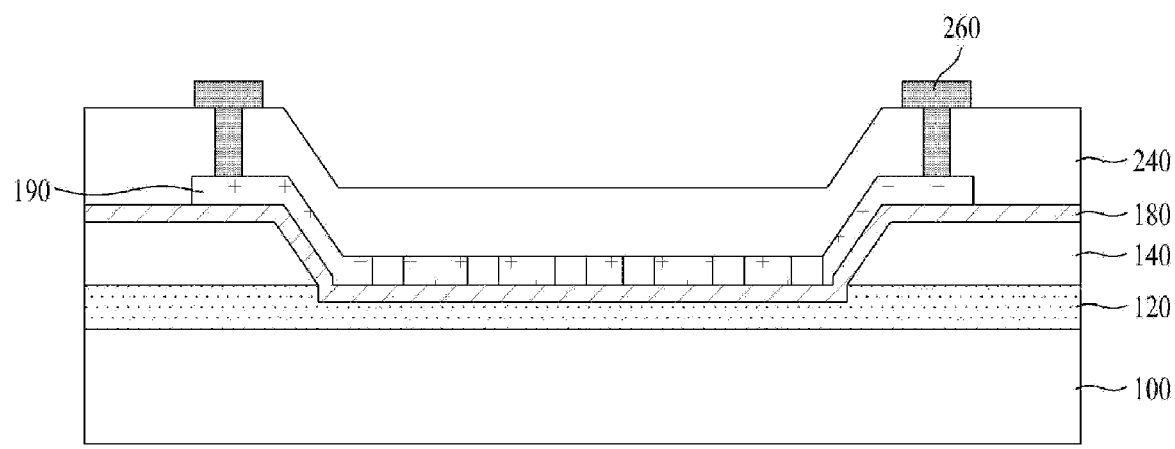

Then, referring to FIG. 6, after removing the photoresist pattern 220 by a stripping process, an insulating film 240 is formed on or over the resultant product, including the top electrode 190. Next, a contact hole is formed to expose outer regions of the top electrode 190 (that is, a desired or predetermined region of the top electrode 190) on or over a surface of the silicon film 140. A metal is subsequently applied to fill the contact hole, and then, the metal is etched to form a metal wiring 260. The metal may be selected from tungsten, copper, aluminum, an aluminum alloy (e.g., with one or more of silicon, titanium, and copper), etc. Prior to filing the contact hole, one or more liner and/or barrier layers may be deposited in the contact hole. The liner and/or barrier layers may be selected from titanium, titanium nitride, tantalum, tantalum nitride, and combinations thereof (e.g., a titanium/titanium nitride bilayer, a tantalum/tantalum nitride bilayer, etc.). Following deposition of metal into the contact hole, the excess metal outside the contact hole (e.g., on the insulating layer 240) can be removed by chemical mechanical polishing (CMP). An overlying metal layer (e.g., Al) can be deposited, masked and etched as described herein and as is known in the art.

Consequently, various embodiments of the present invention may improve optical transmission of a liquid crystal display by forming a top electrode-formable polysilicon layer with a relatively small thickness, compared to conventional polysilicon layers, and may adopt $N_2$ treatment to form an opening in the polysilicon layer, thus considerably enhancing optical transmission of the display.

As such, although the present invention has been concretely described using the foregoing embodiments as well as the accompanying drawings, the present invention is not limited thereto. It will be apparent to those skilled in the art that modifications and variations can be made in the present invention without departing from the spirit or scope of the invention. Accordingly, it is intended that the present invention covers the modifications and variations of this invention provided they come within the scope of the appended claims and their equivalents.

What is claimed is:

1. A method for fabrication of a liquid crystal display, comprising:
    forming a first oxide film, a silicon film, and a second oxide film in sequential order, on a semiconductor substrate;
    selectively etching the silicon film and the second oxide film to expose the first oxide film;
    forming an oxynitride film on or over the first oxide film and the silicon film;
    forming a polysilicon layer over the entire oxynitride film;
    selectively etching the polysilicon layer to form a top electrode;
    forming an insulating film on or over the top electrode; and
    forming metal wiring on outer regions of the top electrode.

2. The method according to claim 1, wherein the oxynitride film is formed by a $N_2$ plasma treatment of at least the second oxide film.

3. The method according to claim 1, wherein the oxynitride film has a predetermined thickness and is on or over an uppermost surface and sidewalls of the silicon film.

4. The method according to claim 3, wherein the oxynitride film is formed to a predetermined depth within the first oxide film.

5. The method according to claim 1, wherein the polysilicon layer is formed on or over the oxynitride film.

6. The method according to claim 1, wherein the polysilicon layer has a thickness of 100 to 150 Å.

7. The method according to claim 1, further comprising selectively etching the polysilicon layer to form a plurality of openings.

8. The method according to claim 7, wherein the openings are spaced from one another at equal or constant intervals.

9. The method according to claim 7, wherein the openings are obtained by etching the polysilicon layer to expose the oxynitride film.

10. The method according to claim 7, wherein each of the openings has a circular or rectangular shape.

11. The method according to claim 7, wherein each of the openings has a polygonal shape.

12. The method according to claim 1, wherein forming the top electrode comprises selectively etching the exposed second oxide film and the exposed silicon film using a photoresist pattern as a mask.

13. The method according to claim 12, wherein selectively etching the exposed second oxide film and the exposed silicon film exposes the first oxide film.

14. The method according to claim 1, further comprising forming a photoresist pattern on and/or over the polysilicon layer prior to selectively etching the polysilicon layer.

15. The method according to claim 1, further comprising forming an insulating film on or over the oxynitride film and the top electrode.

16. The method according to claim 1, wherein forming the metal wirings comprises forming a contact hole exposing outer regions of the top electrode.

17. The method according to claim 1, wherein the metal wirings comprise tungsten, copper, aluminum, or an aluminum alloy.

18. A liquid crystal display, comprising:
 a first oxide film, a silicon film, and a second oxide film in sequential order on a semiconductor substrate, at least the silicon film having an opening therein;
 an oxynitride film in the opening and on or over the first oxide film and the silicon film;
 a polysilicon layer over the oxynitride film;
 an insulating film on or over the polysilicon layer; and
 metal wiring on outer regions of the polysilicon layer.

19. The liquid crystal display according to claim 18, wherein the oxynitride film has a predetermined thickness and is on or over an uppermost surface and sidewalls of the silicon film.

20. The liquid crystal display according to claim 18, further comprising a plurality of openings in the polysilicon layer.

* * * * *